US010059264B2

(12) United States Patent
Kato

(10) Patent No.: US 10,059,264 B2
(45) Date of Patent: Aug. 28, 2018

(54) VEHICULAR VISUAL RECOGNITION DEVICE

(71) Applicant: KABUSHIKI KAISHA TOKAI-RIKA-DENKI-SEISAKUSHO, Aichi-ken (JP)

(72) Inventor: Naofumi Kato, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/697,849

(22) Filed: Sep. 7, 2017

(65) Prior Publication Data

US 2018/0072227 A1   Mar. 15, 2018

(30) Foreign Application Priority Data

Sep. 14, 2016 (JP) ................. 2016-179851

(51) Int. Cl.
   *B60R 1/00* (2006.01)
   *B60R 1/02* (2006.01)
   *B60R 1/04* (2006.01)
   *H04N 7/18* (2006.01)
   *B60R 1/12* (2006.01)

(52) U.S. Cl.
   CPC .............. *B60R 1/00* (2013.01); *B60R 1/02* (2013.01); *B60R 1/04* (2013.01); *B60R 1/12* (2013.01); *H04N 7/183* (2013.01); *B60R 2001/1253* (2013.01); *B60R 2300/70* (2013.01); *B60R 2300/8026* (2013.01); *B60R 2300/8066* (2013.01)

(58) Field of Classification Search
   CPC .............. B60R 1/00; B60R 2001/1253; B60R 2300/8026; B60R 2300/8066

USPC ......................................................... 340/937
See application file for complete search history.

(56) References Cited

U.S. PATENT DOCUMENTS

| 6,281,804 B1 * | 8/2001 | Haller ...................... B60R 1/00 340/901 |
| 9,623,819 B2 * | 4/2017 | Frommann ............ B60K 37/00 |
| 9,878,665 B2 * | 1/2018 | Orellana ................ B60Q 9/008 |
| 2002/0080018 A1 * | 6/2002 | Yamazaki .............. B60Q 9/008 340/436 |

(Continued)

FOREIGN PATENT DOCUMENTS

JP       5929509 A      6/2016

OTHER PUBLICATIONS

Extended European Search Report issued in the corresponding EP application No. 17190295.0 dated Jan. 3, 2018.

*Primary Examiner* — Hirdepal Singh
(74) *Attorney, Agent, or Firm* — Roberts Mlotkowski Safran Cole & Calderon, P.C.

(57) ABSTRACT

There is provided a vehicular visual recognition device including: an imaging section that is provided at a rear of a vehicle and that captures images rearward of a vehicle; a display section that displays an image captured by the imaging section; an optical mirror that is provided at a display face side of the display section, that transmits the captured image being displayed when the display section is in a display state, and that reflects light from rearward of the vehicle when the display section is in a non-display state; and a controller that controls the display section so as to switch the display state of the display section in accordance with a predetermined signal.

2 Claims, 5 Drawing Sheets

(56) References Cited

U.S. PATENT DOCUMENTS

| | | | |
|---|---|---|---|
| 2003/0169522 A1* | 9/2003 | Schofield | B60R 1/04 359/876 |
| 2006/0164220 A1* | 7/2006 | Harter, Jr. | B60R 1/00 340/435 |
| 2009/0079585 A1* | 3/2009 | Chinomi | B60R 1/00 340/901 |
| 2010/0073480 A1* | 3/2010 | Hoek | G01P 1/08 348/148 |
| 2013/0002877 A1* | 1/2013 | Miyoshi | B60R 1/00 348/148 |
| 2015/0043083 A1* | 2/2015 | Konuki | B60R 1/00 359/630 |
| 2016/0241538 A1 | 8/2016 | Khurana et al. | |
| 2017/0072797 A1* | 3/2017 | Oh | B60K 35/00 |
| 2017/0082853 A1* | 3/2017 | Yoshimoto | B60R 1/04 |
| 2017/0193969 A1* | 7/2017 | Kimura | B60R 1/04 |
| 2017/0259743 A1* | 9/2017 | Uchimura | B60R 1/12 |
| 2017/0327044 A1* | 11/2017 | Baur | B60R 1/12 |

* cited by examiner

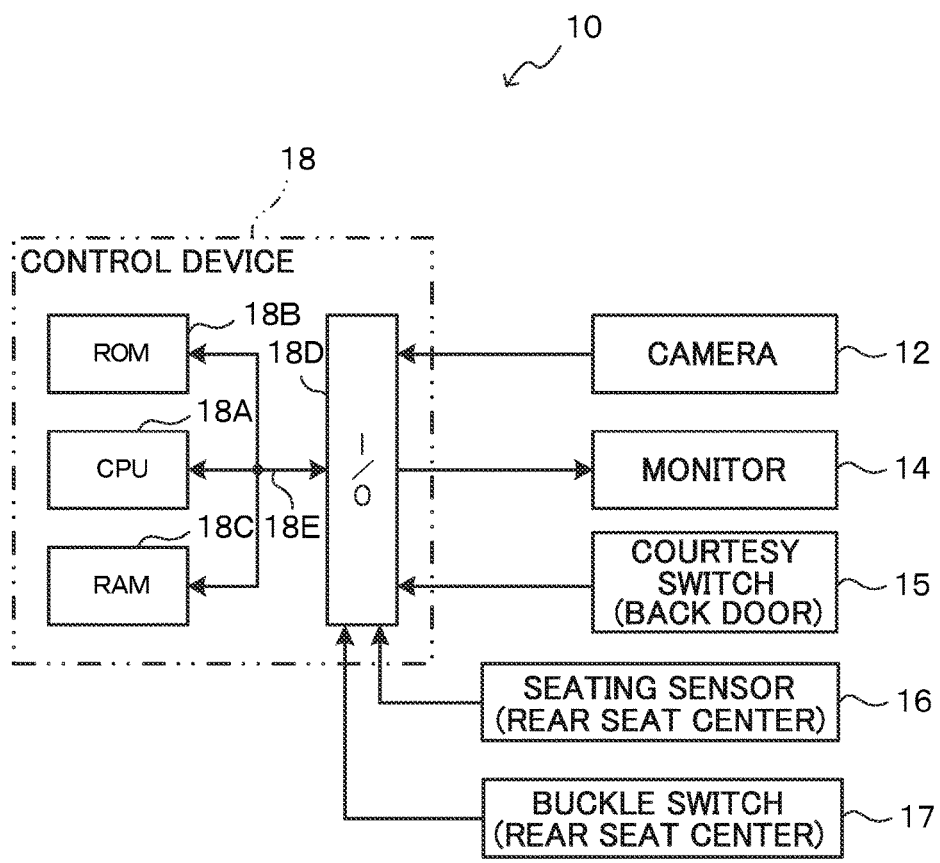

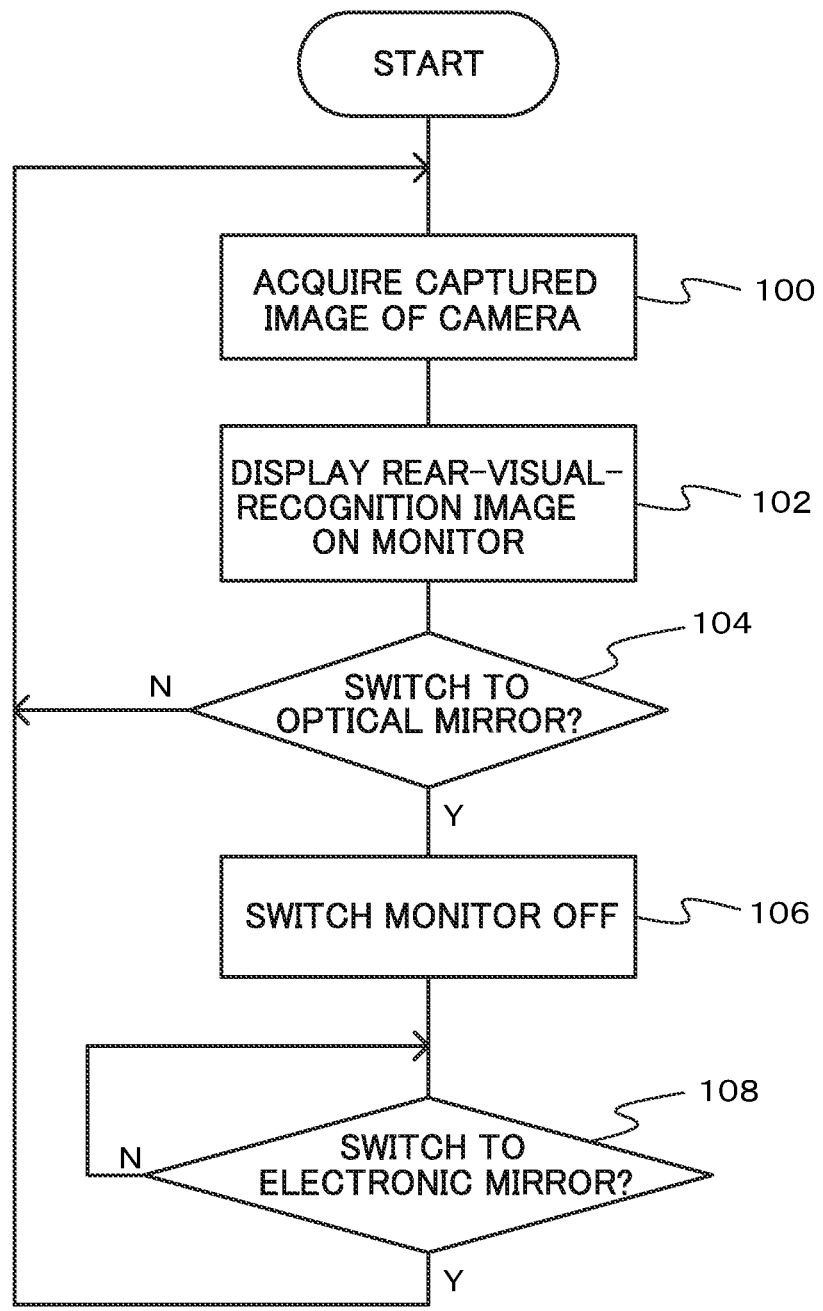

VEHICULAR VISUAL RECOGNITION DEVICE

CROSS-REFERENCE TO RELATED APPLICATION

This application is based on and claims priority under 35 USC 119 from Japanese Patent Application No. 2016-179851 filed on Sep. 14, 2016, the disclosure of which is incorporated by reference herein.

BACKGROUND

Technical Field

The present disclosure relates to a vehicular visual recognition device that images vehicle surroundings and displays a captured image for visual recognition of the vehicle surroundings.

Related Art

Vehicular visual recognition devices are known in which an imaging section such as a camera and a display section such as a monitor are installed to a vehicle, and a captured image of vehicle surroundings captured by the imaging section is displayed on the display section.

Japanese Patent Number 5929509 proposes a vehicular internal rearview mirror system including a display device that displays on a display screen an image according to an image signal output from an image receiver of an onboard camera, a vehicular mirror body built into the display device, an operation lever member, and a power source switch.

In the vehicular internal rearview mirror system, operating the operation lever member switches the power source switch ON/OFF in coordination therewith, enabling switching between rearward checking using a half mirror and rearward checking using the display device.

However, in the technology of Japanese Patent Number 5929509, although the vehicle surroundings can be checked using an image reflected in the half mirror or an image displayed on the display device, an operation lever needs to be manually operated to cause the switch, and this operation is burdensome.

SUMMARY

The present disclosure has been arrived at in consideration of the above circumstances, and the present disclosure provides a vehicular visual recognition device capable of switching without manual operation between checking vehicle surroundings using an optically reflected image and checking the vehicle surroundings using display of an image of the vehicle surroundings, so as to suit a situation of the vehicle.

The achieve the above object, a first aspect of the present disclosure includes an imaging section, a display section, an optical mirror, and a controller. The imaging section is provided at a rear of a vehicle and captures images rearward of a vehicle. The display section displays an image captured by the imaging section. The optical mirror is provided at a display face side of the display section, transmits the captured image being displayed when the display section is in a display state, and reflects light from rearward of the vehicle when the display section is in a non-display state. The controller controls the display section so as to switch the display state of the display section in accordance with a predetermined signal.

According to the first aspect of the present disclosure, rearward of the vehicle is imaged by the imaging section provided at the rear of the vehicle, and the captured image imaged by the imaging section is displayed on the display section.

The optical mirror is provided at the display face side of the display section, transmits the imaging result being displayed when the display section is in the display state, and reflects light from rearward of the vehicle when the display section is in the non-display state. Namely, rearward of the vehicle can be checked using the display section when the display section is in the display state, and rearward of the vehicle can be checked using the reflected image of the optical mirror when the display section is in the non-display state.

The controller controls the display section so as to switch the display state of the display section in accordance with the predetermined signal. Using a signal indicating the situation of the vehicle as the predetermined signal thereby enables, without manual operation, automatic switching between checking the vehicle surroundings using the optically reflected image and checking the vehicle surroundings using the display of the image of the vehicle surroundings to suit the situation of the vehicle.

Note that in a second aspect of the present disclosure, the controller may control the display section so that the display section switches to a non-display state when a signal indicating opening of a back door has been detected as the predetermined signal. This enables loss of rearward checking capability due to the back door being opened to be prevented from occurring in cases in which the imaging section is provided to the back door.

Further, in a third aspect of the present disclosure, the controller may control the display section so that the display section switches to a display state when a signal indicating closing of the back door has been detected as the predetermined signal. Namely, the vehicle surroundings can be checked using the captured image displayed on the display section since the back door is closed.

Further, in a fourth aspect of the present disclosure, the controller may control the display section so that the display section switches to a display state when a signal indicating seating of an occupant in the center of a rear seat has been detected as the predetermined signal. This enables rearward checking to be prevented from becoming difficult due to an occupant in the rear seat.

Further, in a fifth aspect of the present disclosure, the controller may control the display section so that the display section switches to a non-display state when a signal indicating that an occupant is not seated in the center of a rear seat has been detected as the predetermined signal. Namely, the vehicle surroundings can be checked using the optical mirror without the occupant becoming an obstruction.

A sixth aspect of the present disclosure includes an imaging section, a display section, an optically adjustable mirror, and a controller. The imaging section is provided at a rear of a vehicle and captures images rearward of a vehicle. The display section displays an image captured by the imaging section. The optically adjustable mirror is provided at a display face side of the display section, and is able to switch a reflective state between transmitting the captured image being displayed and reflecting light from rearward of the vehicle. The controller controls the optically adjustable mirror so as to switch the reflective state in accordance with a predetermined signal.

According to the sixth aspect of the present disclosure, rearward of the vehicle is imaged by the imaging section provided at the rear of the vehicle, and the captured image imaged by the imaging section is displayed on the display section.

The optically adjustable mirror is provided at the display face side of the display section, and is able to switch a reflective state between transmitting the captured image being displayed and reflecting light from rearward of the vehicle. Namely, rearward checking of the vehicle using the display section is enabled by transmitting the captured image being displayed, and rearward checking of the vehicle using the reflected image is enabled by reflecting light from rearward of the vehicle.

The controller controls the optically adjustable mirror so as to switch the reflective state in accordance with the predetermined signal. Using a signal indicating the situation of the vehicle as the predetermined signal thereby enables, without manual operation, automatic switching between checking the vehicle surroundings using the optically reflected image and checking the vehicle surroundings using the display of the image of the vehicle surroundings to suit the situation of the vehicle.

Note that in a seventh aspect of the present disclosure, the controller may control the optically adjustable mirror so as to switch to the reflecting when a signal indicating opening of the back door has been detected as the predetermined signal. This enables loss of rearward checking capability due to the back door being opened to be prevented from occurring in cases in which the imaging section is provided to the back door.

Further, in an eighth aspect of the present disclosure, the controller may control the optically adjustable mirror so as to switch to transmitting when a signal indicating closing of the back door has been detected as the predetermined signal. Namely, the vehicle surroundings can be checked using the captured image being displayed on the display section since the back door is closed.

Further, in a ninth aspect of the present disclosure, the controller may control the optically adjustable mirror so as to switch to transmitting when a signal indicating seating of an occupant in the center of the rear seat has been detected as the predetermined signal. This enables checking of rearward to be prevented from becoming difficult due to an occupant in the rear seat.

Further, in a tenth aspect of the present disclosure, the controller may control the optically adjustable mirror so as to switch to reflecting when a signal indicating that an occupant is not seated in the center of the rear seat has been detected as the predetermined signal. Namely, the vehicle surroundings can be checked using the optical mirror without the occupant becoming an obstruction.

As described above, according to the present disclosure there is an advantageous effect of enabling provision of a vehicular visual recognition device capable of, without manual operation, switching between checking the vehicle surroundings using the optically reflected image and checking the vehicle surroundings using display of the image of the vehicle surroundings.

BRIEF DESCRIPTION OF THE DRAWINGS

Exemplary embodiments of the present disclosure will be described in detail based on the following figures, wherein:

FIG. 1 is a block diagram illustrating a schematic configuration of a vehicular visual recognition device according to an exemplary embodiment;

FIG. 4 is a flowchart illustrating an example of a flow of processing performed by a control device of a vehicular visual recognition device according to an exemplary embodiment.

DETAILED DESCRIPTION

Figure 2A:
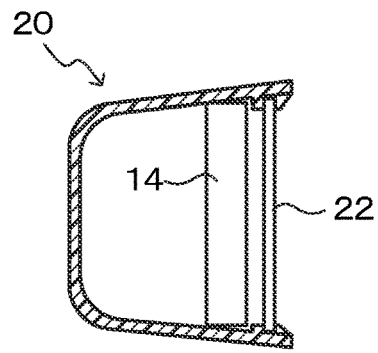
FIG. 2A is a cross-section illustrating a schematic configuration of an internal rearview mirror body.

An example of an exemplary embodiment of the present disclosure is described in detail below, with reference to the drawings. FIG. 1 is a block diagram illustrating a schematic configuration of a vehicular visual recognition device according to the present exemplary embodiment. FIG. 2A is a cross-section illustrating a schematic configuration of an internal rearview mirror body.

A vehicular visual recognition device 10 according to the present exemplary embodiment includes a camera 12 serving as an example of an imaging section, a monitor 14 serving as an example of a display section, courtesy switches 15, seating sensors 16, buckle switches 17, and a control device 18 serving as an example of a controller.

The camera 12 is provided at the vehicle rear, images rearward of the vehicle, and outputs imaging results to the control device 18. In the present exemplary embodiment, the camera 12 is provided to a back door, this being a rear door. Note that the camera 12 may be disposed outside the vehicle or inside the vehicle cabin. Further, the camera 12 may be provided to the trunk in the case of a sedan-type vehicle.

Figure 2B:
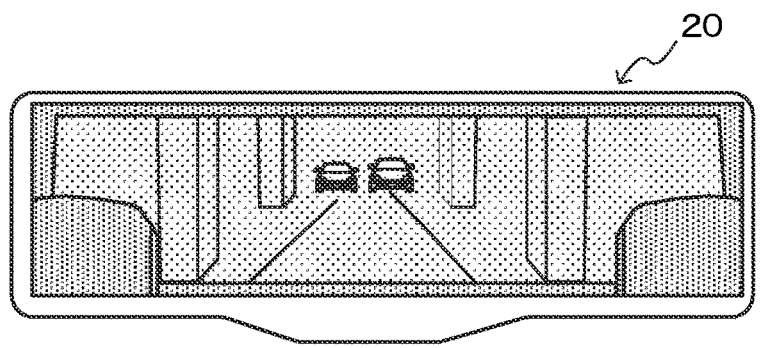
FIG. 2B is a diagram illustrating an example of an image reflected by a half mirror when a monitor is OFF.
Figure 2C:
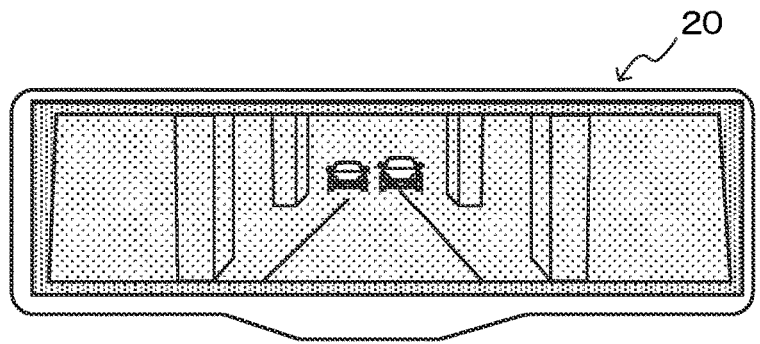
FIG. 2C is a diagram illustrating an example of a rear-visual-recognition image displayed on a monitor.

The monitor 14 is provided inside an internal rearview mirror body 20 and is connected to the control device 18. A rear-visual-recognition image is generated using an imaging result of the camera 12 under control by the control device 18 and the generated rear-visual-recognition image is displayed on the monitor 14. A half mirror 22 serving as an example of an optical mirror is provided to a display face side of the monitor 14 of the internal rearview mirror body 20. When the monitor 14 is switched ON and in a display state, the half mirror 22 transmits the image being displayed and enables a rear field of view to be checked using the monitor 14. On the other hand, when the monitor 14 is switched OFF and in a non-display state, the rear field of view can be checked using an optically reflected image of the half mirror 22. For example, FIG. 2B illustrates an example of an image reflected by the half mirror 22 when the monitor 14 is OFF, and FIG. 2C illustrates an example of a rear-visual-recognition image displayed on the monitor 14. Image processing, such as changing a range cut out from the captured image or image enlargement/reduction, is preferably carried out so that the rear-visual-recognition image displayed on the monitor 14 (FIG. 2C) has the same field of view as the image reflected by the half mirror 22 (FIG. 2B). This suppresses a sense of unease when switching between rearward checking using the half mirror 22 and rearward checking using the monitor 14.

The courtesy switches 15 are switches for detecting opening and closing of each door provided to the vehicle, and respective ON/OFF signals of the courtesy switches 15 are input to the control device 18 as signals indicating opening and closing of doors. Although a courtesy switch 15 is provided to correspond to each door, FIG. 1 illustrates the courtesy switch 15 that detects opening and closing of the back door.

The seating sensors 16 detect seating in each seat provided to the vehicle and input detection results to the control device 18. Likewise, although the seating sensors 16 are provided to correspond to each seat of the vehicle, FIG. 1 illustrates the seating sensor 16 that detects seating in a center seat of a rear seat.

The buckle switches 17 are switches provided to each buckle for detecting wearing of each seatbelt provided to the vehicle, and detection results of the buckle switch 17 are input to the control device 18. Likewise, although the buckle switches 17 are provided to correspond to each seat in the vehicle, FIG. 1 illustrates the buckle switch 17 of the center seat of the rear seat.

The control device 18 is configured by a microcomputer in which a CPU 18A, ROM 18B, RAM 18C, and an input/output interface (I/O) 18D are connected together by a bus 18E.

The ROM 18B stores various programs such as a vehicular visual recognition control program for performing display control to display the rear-visual-recognition image on the monitor 14. Programs stored in the ROM 18B are expanded into the RAM 18C and executed by the CPU 18A so as to perform display control on the monitor 14.

The camera 12, the monitor 14, the courtesy switches 15, the seating sensors 16, and the buckle switches 17 are each connected to the I/O 18D. The control device 18 acquires an imaging result of the camera 12, generates a rear-visual-recognition image for display on the monitor 14, and displays the generated rear-visual-recognition image on the monitor 14.

Figure 3A:
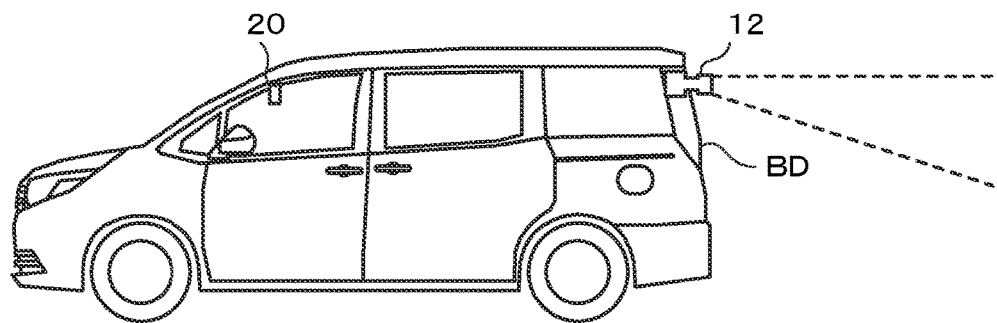
FIG. 3A is a diagram illustrating a closed state of a back door.
Figure 3B:
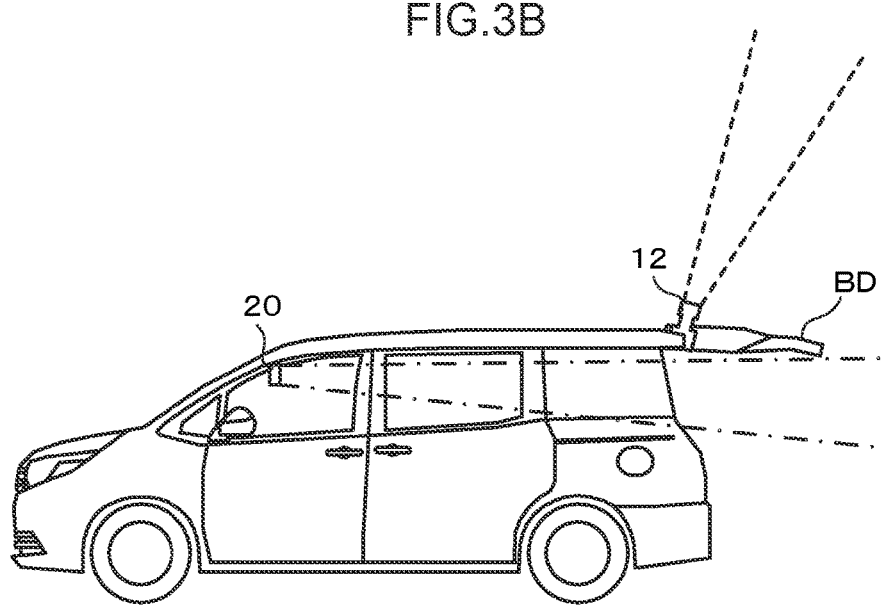
FIG. 3B is a diagram illustrating an open state of a back door.

Since the camera 12 is provided to a back door BD in the present exemplary embodiment, as illustrated in FIG. 3A, when the back door BD is opened, the imaging direction of the camera 12 moves upward so as to image the sky, and an image of the sky is displayed on the monitor 14, as illustrated in FIG. 3B. In this state, rearward checking ability is lost due to the sky being displayed on the monitor 14.

Further, in a state in which an occupant has boarded to the center of the rear seat, the occupant is an obstruction when rearward checking using the half mirror, and checking the rear field of view is difficult.

Namely, although rearward checking using the half mirror 22 and rearward checking using the monitor 14 are preferably used as suits the situation of the vehicle, manually switching is burdensome.

Thus, in the present exemplary embodiment, control to switch between rearward checking using the half mirror 22 and rearward checking using the monitor 14 is performed in accordance with the situation of the vehicle. More specifically, in the present exemplary embodiment, a signal of at least one out of the courtesy switch 15, the seating sensor 16, or the buckle switch 17 is set as a predetermined signal, and the control device 18 controls the monitor 14 so that the display state of the monitor 14 switches in accordance with the predetermined signal.

For example, the courtesy switch 15 detects opening of the back door BD, and when opening of the back door BD has been detected, the control device 18 performs control to switch the monitor 14 OFF and to switch to rearward checking using the half mirror 22. On the other hand, when closing of the back door BD has been detected, the control device 18 performs control to switch the monitor 14 ON and to switch to rearward checking using the monitor 14.

Further, seating of an occupant in the center of the rear seat is detected by at least one out of the seating sensor 16 or the buckle switch 17, and when seating of an occupant in the center of the rear seat has been detected, the control device 18 performs control to switch the monitor 14 ON and to switch to rearward checking using the monitor 14. On the other hand, when seating in the center of the rear seat has not been detected, the control device 18 performs control to switch the monitor 14 OFF and to switch to rearward checking using the half mirror 22.

Note that the above-described control based on opening and closing the door as described above and the above-described control based on whether or not there is an occupant seated in the center of the rear seat need not all be performed; a mode in which either one is performed may be employed.

Explanation follows regarding specific processing performed by the control device 18 of the vehicular visual recognition device 10 according to the present exemplary embodiment configured as described above. FIG. 4 is a flowchart illustrating an example of a flow of processing performed by the control device 18 of the vehicular visual recognition device 10 according to the present exemplary embodiment. Note that, for example, the processing in FIG. 4 starts when an ignition switch, not illustrated in the drawings, has been switched ON.

At step 100, the CPU 18A acquires the captured image of the camera 12 and transitions to step 102.

At step 102, the CPU 18A generates a rear-visual-recognition image from the captured image and displays the generated rear-visual-recognition image on the monitor 14. This enables rearward checking to be performed using the rear-visual-recognition image displayed on the monitor 14. Note that the captured image may be displayed as-is on the monitor 14 as the rear-visual-recognition image, or the rear-visual-recognition image may be generated and displayed on the monitor 14 by performing various corrections such as a brightness correction and a white balance correction.

At step 104, the CPU 18A determines whether or not to switch to the half mirror 22, which is an optical mirror. This determination is, for example, a determination as to whether or not opening of the back door BD was detected by the courtesy switch 15, or determination as to whether or not an occupant is detected not to be seated in the center of the rear seat using at least one out of the seating sensor or the buckle switch 17. Processing transitions to step 106 in cases in which the determination is affirmative, or processing returns to step 100 and the above processing is repeated in cases in which the determination is negative.

At step 106, the CPU 18A controls the monitor 14 such that the monitor 14 is switched OFF, and processing transitions to step 108. Accordingly, in situations in which rearward checking using the monitor 14 is not possible, the monitor 14 is switched OFF such that the rearward image is optically reflected and emitted from the half mirror 22, enabling rearward checking to be performed.

At step 108, the CPU 18A determines whether or not to switch to the monitor 14, which serves as an electronic mirror. This determination is, for example, determination as to whether or not the back door BD is closed made by using the courtesy switch 15, or determination as to whether or not the back door BD is closed and seating of an occupant in the center of the rear seat has been detected using at least one out of the seating sensor or the buckle switch 17. Standby is adopted until this determination is affirmative, and then processing returns to step 100 and the above processing is repeated.

Thus, in the present exemplary embodiment, without manual switching, rearward checking using the half mirror 22 is enabled in cases in which the back door BD is open and rearward of the vehicle cannot be displayed on the monitor 14. Further, without manual switching, rearward checking using the monitor 14 is enabled in cases in which an occupant is seated in the center of the rear seat and rearward checking using the half mirror 22 is difficult. This enables switching between checking the vehicle surroundings using an optically reflected image and checking of the vehicle surroundings using display of an image of the vehicle surroundings, so as to suit the situation of the vehicle.

Figure 5:
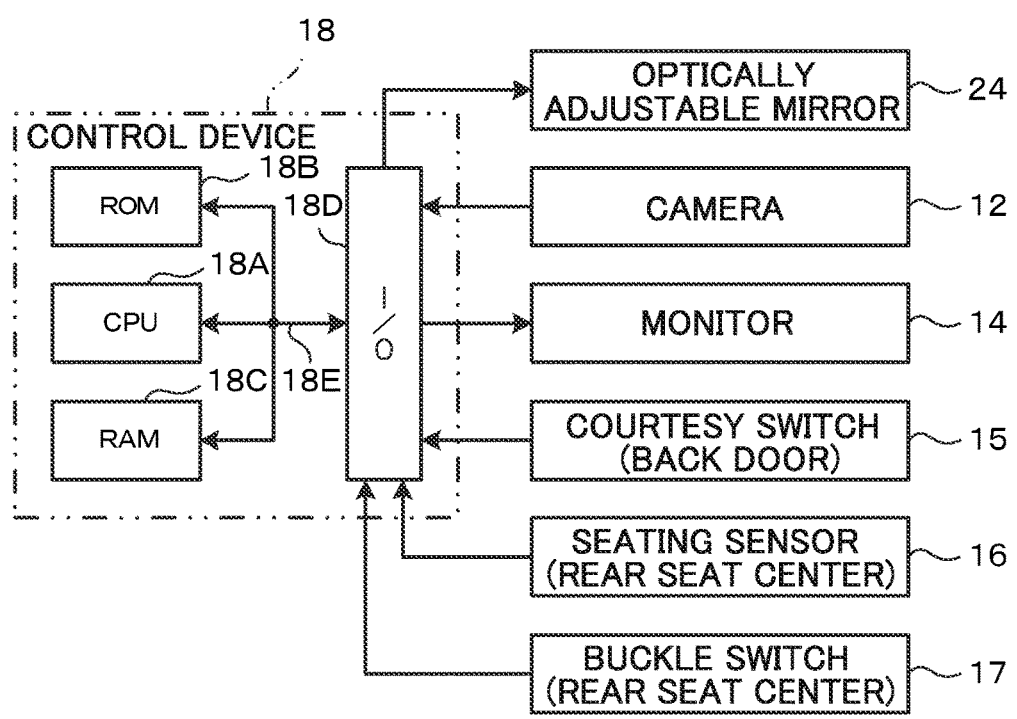
FIG. 5 is a block diagram illustrating a schematic configuration of a modified example of a vehicular visual recognition device according to an exemplary embodiment.

Note that in the exemplary embodiment above, an example was described in which the half mirror 22 reflects light from rearward as a result of the monitor 14 being switched OFF, and the half mirror 22 transmits the image being displayed on the monitor 14 as a result of the monitor 14 being switched ON; however, there is no limitation thereto. For example, an optically adjustable mirror capable of switching a reflective state between transmitting or reflecting may be employed instead of the half mirror 22. Namely, as illustrated in FIG. 5, an optically adjustable mirror 24 may be connected to the control device 18, and the control device 18 may perform control similar to that of the exemplary embodiment above by performing control to switch the optically adjustable mirror 24 between reflecting and transmitting. In such cases, when the optically adjustable mirror 24 is switched to reflecting, the monitor 14 may remain ON or may be switched OFF to conserve power.

Further, in the exemplary embodiment above, an example was described in which the courtesy switch 15, the seating sensor 16, and the buckle switch 17 are provided and any of the signals therefrom are used to switch between rearward checking using the half mirror 22 and rearward checking using the monitor 14; however, there is no limitation thereto. For example, it is sufficient to provide at least one of these and to perform switching by at least one of the signals. In the exemplary embodiment above, an example was described in which the seating sensor 16 and the buckle switch 17 are provided for detecting seating of an occupant in the center of the rear seat; however, either one of these may be provided alone to detect seating of an occupant in the center of the rear seat.

The processing performed by the control device 18 in each of the above exemplary embodiment has been explained as software processing; however, configuration is not limited thereto. For example, the processing may be performed by hardware, or the processing may be performed by a combination of both hardware and software.

The processing performed by the control device 18 in each of the above exemplary embodiments may be distributed as a program stored in a storage medium.

The present disclosure is not limited by the above description, and obviously, in addition to the above, various modifications may be implemented within a range not departing from the spirit of the present disclosure.

What is claimed is:

1. A vehicular visual recognition device comprising:
a camera that is provided at a rear of a vehicle and that captures images rearward of a vehicle;
a monitor that displays an image captured by the camera;
an optical mirror that is provided at a display face side of the monitor, that transmits the captured image being displayed when the monitor is in a display state, and that reflects light from rearward of the vehicle when the monitor is in a non-display state; and
a controller that controls the monitor so as to switch the display state of the monitor in accordance with a predetermined signal in at least one of:
the non-display state when a signal indicating opening of a back door has been detected as the predetermined signal;
the display state when a signal indicating closing of the back door has been detected as the predetermined signal;
the display state when a signal indicating seating of an occupant in the center of a rear seat has been detected as the predetermined signal, and
the non-display state when a signal indicating that an occupant is not seated in the center of a rear seat has been detected as the predetermined signal.

2. A vehicular visual recognition device comprising:
a camera that is provided at a rear of a vehicle and that captures images rearward of a vehicle;
a monitor that displays an image captured by the camera;
an optically adjustable mirror that is provided at a display face side of the monitor, and that is able to switch a reflective state between transmitting the captured image being displayed and reflecting light from rearward of the vehicle; and
a controller that controls the optically adjustable mirror so as to switch the reflective state in accordance with a predetermined signal in at least one of:
reflecting when a signal indicating opening of the back door has been detected as the predetermined signal;
transmitting when a signal indicating closing of the back door has been detected as the predetermined signal;
transmitting when a signal indicating seating of an occupant in the center of the rear seat has been detected as the predetermined signal, and
reflecting when a signal indicating that an occupant is not seated in the center of the rear seat has been detected as the predetermined signal.

* * * * *